US012505778B2

(12) United States Patent
Cho et al.

(10) Patent No.: US 12,505,778 B2
(45) Date of Patent: Dec. 23, 2025

(54) DISPLAY APPARATUS AND METHOD OF DRIVING DISPLAY PANEL USING THE SAME

(71) Applicant: Samsung Display Co., LTD., Yongin-si (KR)

(72) Inventors: Seongheon Cho, Yongin-si (KR); Kuk-Hwan Ahn, Yongin-si (KR); Seungjae Lee, Yongin-si (KR); Dae-Gwang Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/629,325

(22) Filed: Apr. 8, 2024

(65) Prior Publication Data

US 2025/0046226 A1 Feb. 6, 2025

(30) Foreign Application Priority Data

Jul. 31, 2023 (KR) ........................ 10-2023-0099601

(51) Int. Cl.
*G09G 3/20* (2006.01)

(52) U.S. Cl.
CPC ......... *G09G 3/2007* (2013.01); *G09G 3/2092* (2013.01); *G09G 2310/0267* (2013.01); *G09G 2310/027* (2013.01); *G09G 2320/041* (2013.01); *G09G 2320/043* (2013.01)

(58) Field of Classification Search
CPC ............... G09G 3/2007; G09G 3/2092; G09G 2310/0267; G09G 2310/027; G09G 2320/041; G09G 2320/043
See application file for complete search history.

(56) References Cited

U.S. PATENT DOCUMENTS

2017/0236490 A1* 8/2017 Cheon ...................... G09G 5/10 345/691
2020/0202817 A1* 6/2020 Li ............................ G09G 5/30

FOREIGN PATENT DOCUMENTS

KR 10-2019-0029833 3/2019
KR 10-2019-0088150 7/2019
KR 10-2078093 2/2020
KR 10-2023-0057496 5/2023

* cited by examiner

*Primary Examiner* — Robert J Michaud
(74) *Attorney, Agent, or Firm* — F. CHAU & ASSOCIATES, LLC

(57) ABSTRACT

A display apparatus includes a driving controller, a data driver and a display panel. The driving controller is configured to determine an average load of a unit area based on an average grayscale value of the unit area and a pixel area ratio of the unit area, to determine a temperature diffusion load of the unit area based on average loads, temperature diffusion ratios and weight ratios of adjacent unit areas adjacent to the unit area and to compensate input image data based on the average load of the unit area and the temperature diffusion load of the unit area to generate a compensated data signal. The data driver is configured to convert the compensated data signal into a data voltage. The display panel is configured to display an image based on the data voltage.

18 Claims, 15 Drawing Sheets

DISPLAY APPARATUS AND METHOD OF DRIVING DISPLAY PANEL USING THE SAME

CROSS REFERENCE TO RELATED APPLICATION(S)

This application claims priority to and benefits of Korean Patent Application No. 10-2023-0099601 under 35 U.S.C. § 119, filed on Jul. 31, 2023 in the Korean Intellectual Property Office (KIPO), the contents of which are herein incorporated by reference in their entireties.

BACKGROUND

1. Technical Field

Embodiments of the disclosure relate to a display apparatus and a method of driving a display panel using the display apparatus. More particularly, embodiments of the disclosure relate to a display apparatus accurately determining an average load and a temperature diffusion load of a unit area in the display apparatus having an atypical display area and a method of driving a display panel using the display apparatus.

2. Description of the Related Art

Generally, a display apparatus includes a display panel and a display panel driver. The display panel displays an image based on input image data. The display panel includes one or more gate lines, one or more data lines and one or more pixels. The display panel driver includes a gate driver, a data driver and a driving controller. The gate driver outputs gate signals to the gate lines. The data driver outputs data voltages to the data lines. The driving controller controls an operation of the gate driver and an operation of the data driver.

A special-purpose display panel, such as a display panel used inside an automotive vehicle, may include an atypical display area rather than a typical display area such as a rectangular display area.

In case that an average load and a temperature diffusion load are determined in a conventional method for the atypical display area, the average load and the temperature diffusion load may be determined inaccurately. As a result, compensation according to the load is not operated accurately so that a display quality of the display panel may be deteriorated.

SUMMARY

Embodiments of the disclosure provide a display apparatus accurately determining an average load and a temperature diffusion load of a unit area in the display apparatus having an atypical display area.

Embodiments of the disclosure also provide a method of driving a display panel using the display apparatus.

In an embodiment of a display apparatus according to the disclosure, the display apparatus includes a driving controller, a data driver and a display panel. The driving controller is configured to determine an average load of a unit area based on an average grayscale value of the unit area and a pixel area ratio of the unit area, to determine a temperature diffusion load of the unit area based on average loads, temperature diffusion ratios and weight ratios of adjacent unit areas adjacent to the unit area and to compensate input image data based on the average load of the unit area and the temperature diffusion load of the unit area to generate a compensated data signal. The data driver is configured to convert the compensated data signal into a data voltage. The display panel is configured to display an image based on the data voltage.

In an embodiment, the pixel area ratio of the unit area may be determined based on a ratio of a pixel area in the unit area and a non-pixel area in the unit area.

In an embodiment, the driving controller may be configured to convert the average grayscale value of the unit area into a first average load and to determine the average load of the unit area by multiplying the first average load by the pixel area ratio.

In an embodiment, the driving controller may be configured to determine an average grayscale value of the pixel area by multiplying the average grayscale value of the unit area by the pixel area ratio and to convert the average grayscale value of the pixel area into the average load of the unit area.

In an embodiment, the temperature diffusion ratios may be ratios representing temperature diffusion between neighboring unit areas. As a distance between a first unit area and a central unit area increases, a temperature diffusion ratio of the central unit area at the first unit area may decrease.

In an embodiment, the temperature diffusion load of an adjacent unit area adjacent to the central unit area may be determined by multiplying an average load of the central unit area by a temperature diffusion ratio of the central unit area and a weight ratio of the central unit area.

In an embodiment, as the pixel area ratio of the central unit area decreases, the weight ratio of the central unit area may decrease.

In an embodiment, the pixel area ratio of the central unit area may be different from the weight ratio of the central unit area.

In an embodiment, the display panel may include a first display area which is an atypical display area and a second display area which is a typical display area.

In an embodiment, at least one unit area of the atypical display area may include a non-pixel area. All unit areas of the typical display area may include only pixel areas.

In an embodiment, in case that the input image data are of the atypical display area, the driving controller may be configured to determine the average load of the unit area based on the average grayscale value of the unit area and the pixel area ratio of the unit area and to determine the temperature diffusion load of the unit area based on the average loads, the temperature diffusion ratios and the weight ratios of the adjacent unit areas adjacent to the unit area.

In an embodiment, in case that the input image data are of the typical display area, the driving controller may be configured to determine the average load of the unit area based on the average grayscale value of the unit area and to determine the temperature diffusion load of the unit area based on the average loads and the temperature diffusion ratios of the adjacent unit areas adjacent to the unit area.

In an embodiment, the display apparatus may further include a gate driver configured to output a gate signal to the display panel. The gate driver may be disposed adjacent to a shorter side of the display panel. The data driver may be disposed adjacent to a longer side of the display panel. The display panel may include a gate line extending in an extending direction of the longer side of the display panel and a data line extending in an extending direction of the shorter side of the display panel.

In an embodiment, the display apparatus may further include a gate driver configured to output a gate signal to the display panel. The gate driver may be disposed adjacent to a longer side of the display panel. The data driver may be disposed adjacent to the longer side of the display panel. The display panel may include a gate line extending in an extending direction of a shorter side of the display panel, a first data line extending in an extending direction of the longer side of the display panel and a second data line extending in the extending direction of the shorter side of the display panel.

In an embodiment of a method of driving a display panel according to the disclosure, the method includes determining an average load of a unit area based on an average grayscale value of the unit area and a pixel area ratio of the unit area, determining a temperature diffusion load of the unit area based on average loads, temperature diffusion ratios and weight ratios of adjacent unit areas adjacent to the unit area, compensating input image data based on the average load of the unit area and the temperature diffusion load of the unit area to generate a compensated data signal and displaying an image based on the compensated data signal.

In an embodiment, the pixel area ratio of the unit area may be determined based on a ratio of a pixel area in the unit area and a non-pixel area in the unit area.

In an embodiment, the temperature diffusion ratios may be ratios representing temperature diffusion between neighboring unit areas. As a distance between a first unit area and a central unit area increases, a temperature diffusion ratio of the central unit area at the first unit area may decrease.

In an embodiment, the temperature diffusion load of an adjacent unit area adjacent to the central unit area may be determined by multiplying an average load of the central unit area by a temperature diffusion ratio of the central unit area and a weight ratio of the central unit area.

In an embodiment, as the pixel area ratio of the central unit area decreases, the weight ratio of the central unit area may decrease.

In an embodiment of a method of driving a display panel according to the disclosure, the method includes determining whether input image data are of an atypical display area or a typical display area, determining an average load of a unit area based on an average grayscale value of the unit area and a pixel area ratio of the unit area and determining a temperature diffusion load of the unit area based on average loads, temperature diffusion ratios and weight ratios of adjacent unit areas adjacent to the unit area in case that the input image data are of the atypical display area, determining the average load of the unit area based on the average grayscale value of the unit area and determining the temperature diffusion load of the unit area based on the average loads and the temperature diffusion ratios of the adjacent unit areas adjacent to the unit area in case that the input image data are of the typical display area, generating a compensated data signal by compensating the input image data based on the average load of the unit area and the temperature diffusion load of the unit area and displaying an image based on the compensated data signal.

According to the display apparatus and the method of driving the display panel using the display apparatus, the driving controller may determine the average load of the unit area based on the average grayscale value of the unit area and the pixel area ratio of the unit area, so that the accuracy of the average load in the display apparatus including the atypical display area may be increased.

The driving controller may determine the temperature diffusion load of the unit area based on the average loads, the temperature diffusion ratios and the weight ratios of the adjacent unit areas adjacent to the unit area so that the accuracy of the temperature diffusion load in the display apparatus including the atypical display area may be increased.

The accuracy of the average load and the accuracy of the temperature diffusion load are increased so that the accuracy of the compensation of the input image data using the average load and the temperature diffusion load may be increased. Accordingly, the display quality of the display panel may be enhanced.

BRIEF DESCRIPTION OF THE DRAWINGS

The above and other features and advantages of the disclosure will become more apparent by describing in detailed embodiments thereof with reference to the accompanying drawings, in which.

DETAILED DESCRIPTION OF THE EMBODIMENTS

Figure 1:
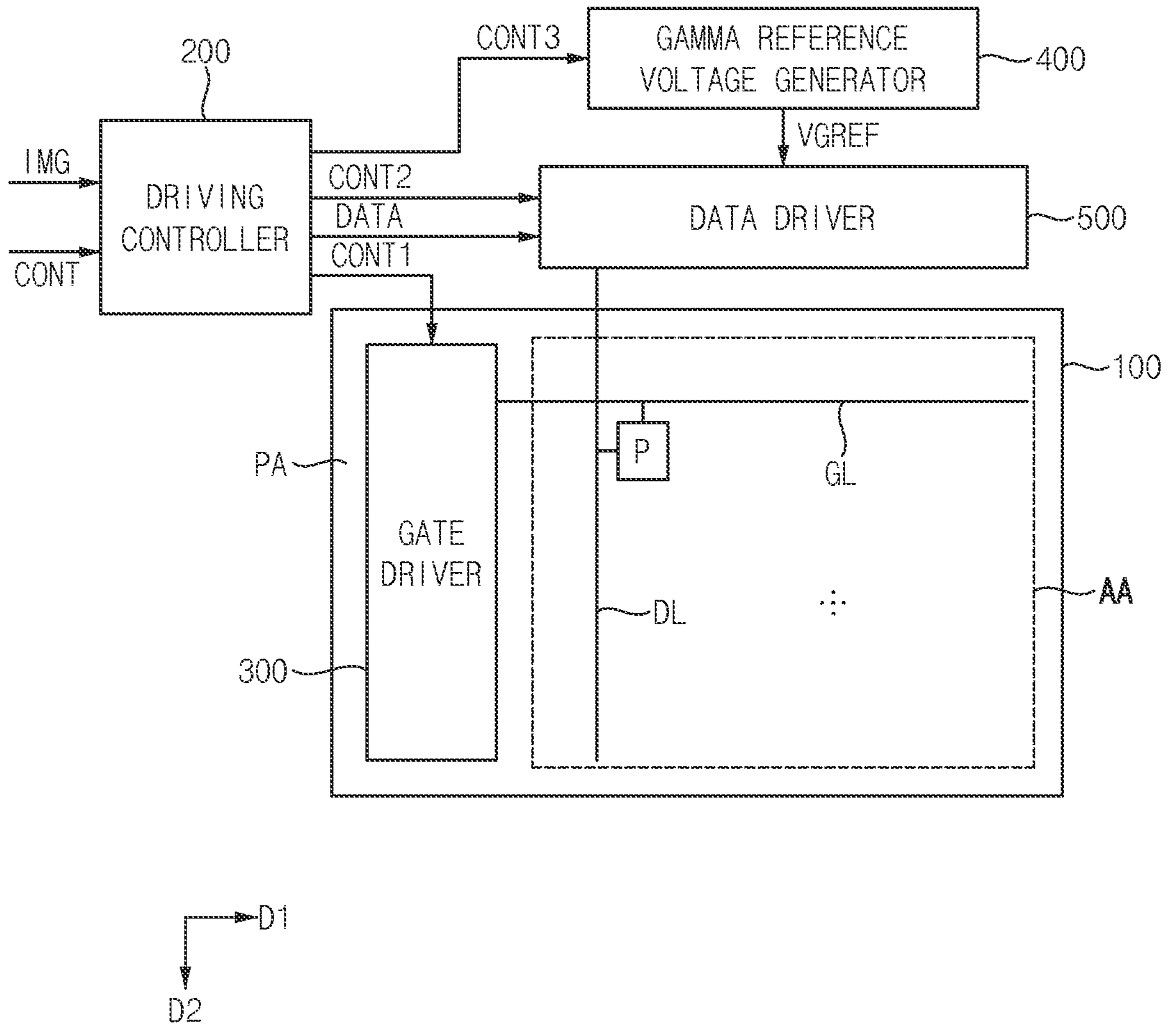
FIG. 1 is a schematic block diagram illustrating a display apparatus according to an embodiment of the disclosure.

Hereinafter, the disclosure will be explained in detail with reference to the accompanying drawings.

As the disclosure allows for various changes and numerous embodiments, some embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a schematic block diagram illustrating a display apparatus according to an embodiment of the disclosure.

Referring to FIG. 1, the display apparatus may include a display panel 100 and a display panel driver. The display panel driver may drive the display panel 100. The display panel driver may include a driving controller 200, a gate driver 300, a gamma reference voltage generator 400 and/or a data driver 500.

For example, the driving controller 200 and the data driver 500 may be integrally formed (or integral with each other). For example, the driving controller 200, the gamma reference voltage generator 400 and the data driver 500 may be integrally formed. A driving module including at least the driving controller 200 and the data driver 500 which are integrally formed may be referred to as a timing controller embedded data driver (TED).

The display panel 100 may have a display region AA on which an image is displayed and a peripheral region PA adjacent to the display region AA.

The display panel 100 may include one or more gate lines GL, one or more data lines DL and one or more pixels P connected to the gate lines GL and the data lines DL. The gate lines GL may extend in a first direction D1 and the data lines DL may extend in a second direction D2 crossing the first direction D1.

The driving controller 200 may receive input image data IMG and an input control signal CONT from an external apparatus (e.g. an application processor). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

In the embodiment, the driving controller 200 may determine an average load of a unit area of the display panel 100 based on an average grayscale value of the unit area and a pixel area ratio of the unit area, may determine a temperature diffusion load of the unit area based on average loads, temperature diffusion ratios and weight ratios of adjacent unit areas adjacent to the unit area and may compensate the input image data IMG based on the average load of the unit area and the temperature diffusion load of the unit area to generate a compensated data signal DATA.

The driving controller 200 may generate the third control signal CONT3 for controlling an operation of the gamma reference voltage generator 400 based on the input control signal CONT, and may output the third control signal CONT3 to the gamma reference voltage generator 400.

The gate driver 300 may generate gate signals driving the gate lines GL in response to the first control signal CONT1 received from the driving controller 200. The gate driver 300 may output the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 may generate a gamma reference voltage VGREF in response to the third control signal CONT3 received from the driving controller 200.

The gamma reference voltage generator 400 may provide the gamma reference voltage VGREF to the data driver 500.

In an embodiment, the gamma reference voltage generator 400 may be disposed in the driving controller 200, or in the data driver 500.

The data driver 500 may receive the second control signal CONT2 and the data signal DATA from the driving controller 200, and may receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

In the embodiment, the gate driver 300 may be disposed adjacent to a shorter side of the display panel 100. The data driver 500 may be disposed adjacent to a longer side of the display panel 100. The display panel 100 may include the gate line GL extending in an extending direction of the longer side of the display panel 100 and the data line DL extending in an extending direction the shorter side of the display panel 100.

Figure 2:
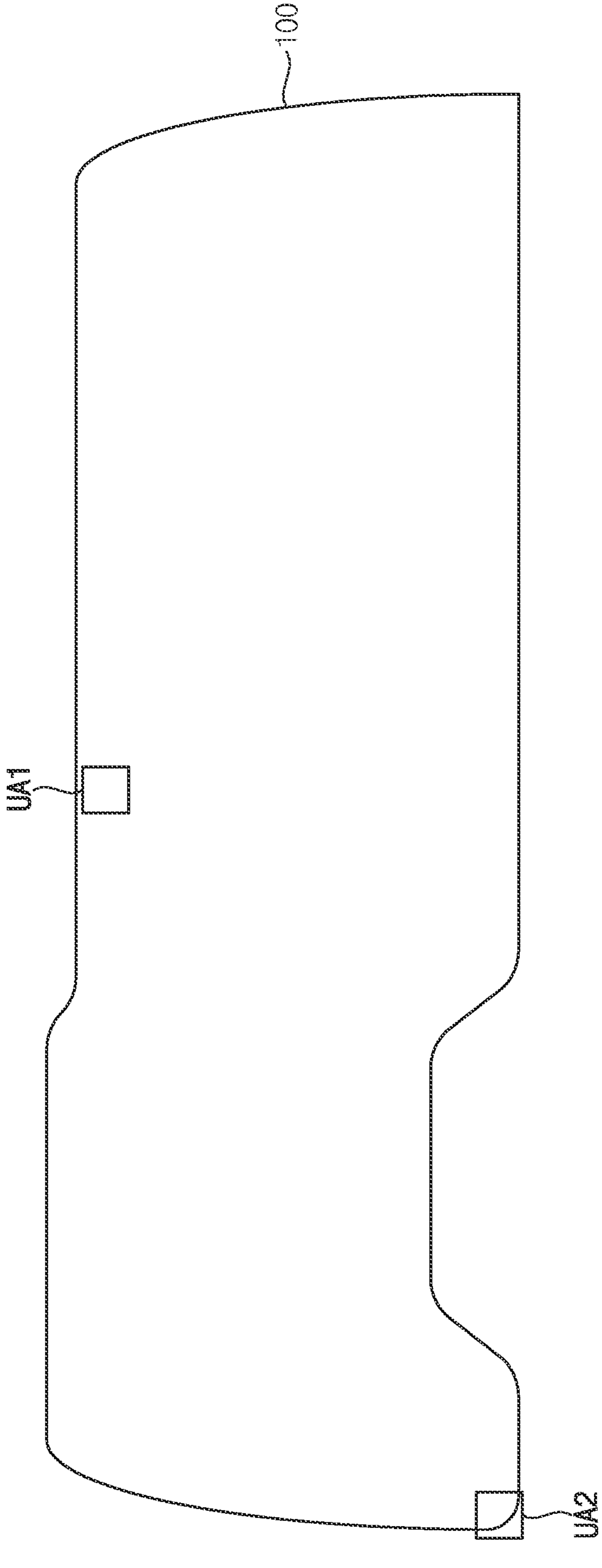
FIG. 2 is a schematic diagram illustrating an example of a display panel of FIG. 1.
Figure 3:
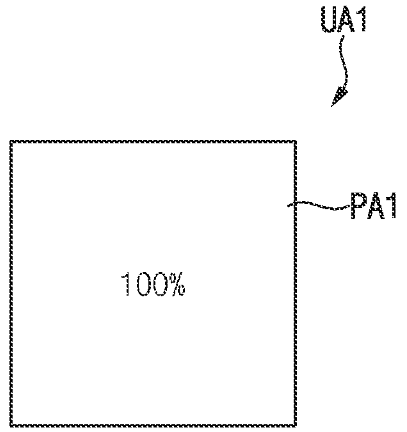
FIG. 3 is a schematic diagram illustrating a first unit area of FIG. 2.
Figure 4:
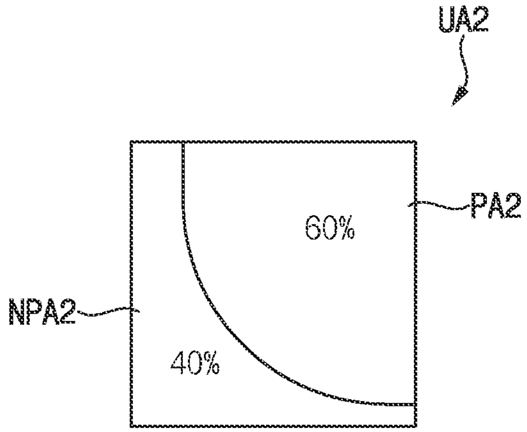
FIG. 4 is a schematic diagram illustrating a second unit area of FIG. 2.

FIG. 2 is a schematic diagram illustrating an example of the display panel 100 of FIG. 1. FIG. 3 is a schematic diagram illustrating a first unit area UA1 of FIG. 2. FIG. 4 is a schematic diagram illustrating a second unit area UA2 of FIG. 2.

Referring to FIGS. 1 to 4, the display panel 100 may have an atypical shape which is not a rectangular shape. For example, the display panel 100 may be a display panel inside an automotive vehicle. For example, compared to a typical display, the display panel 100 may include a long side in the first direction D1 and a short side in the second direction D2. For example, each of an upper side, a lower side, a left side and a right side of the display panel 100 may have a curved portion.

The display panel 100 may include a first unit area UA1 and a second unit area UA2. The first unit area UA1 and the second unit area UA2 may have the same size.

The first area UA1 may be a typical unit area which includes only a pixel area PA1. The second unit area UA2 may be an atypical unit area which includes a pixel area PA2 and a non-pixel area NPA2.

The pixel area ratio of the unit area may be determined based on a ratio of the pixel area and the non-pixel area in the unit area.

For example, the ratio between the pixel area PA1 and the non-pixel area in the first unit area UA1 may be 100:0. Thus, the pixel area ratio of the first unit area UA1 may be 100%.

For example, the ratio between the pixel area PA2 and the non-pixel area NPA2 in the second unit area UA2 may be 60:40. Thus, the pixel area ratio of the second unit area UA2 may be 60%.

Figure 5:
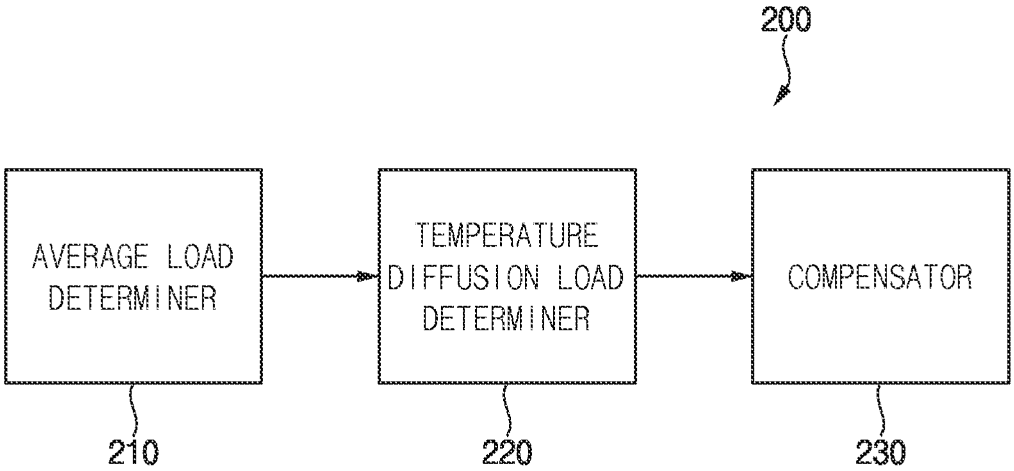
FIG. 5 is a schematic block diagram illustrating a driving controller of FIG. 1.
Figure 6:
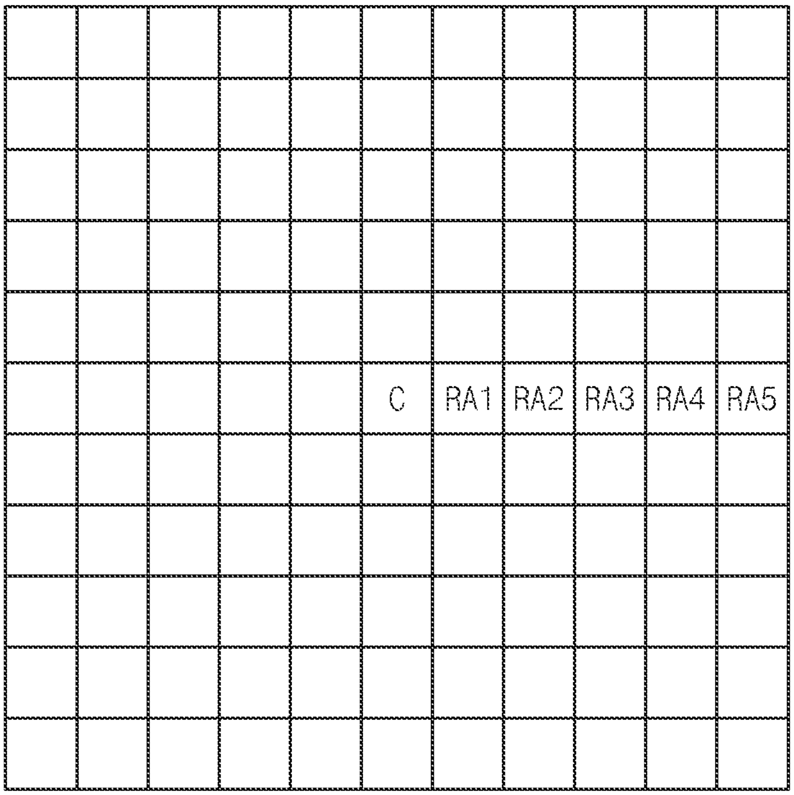
FIGS. 6 and 7 are schematic diagrams illustrating an operation of a temperature diffusion load determiner of FIG. 5.
Figure 7:
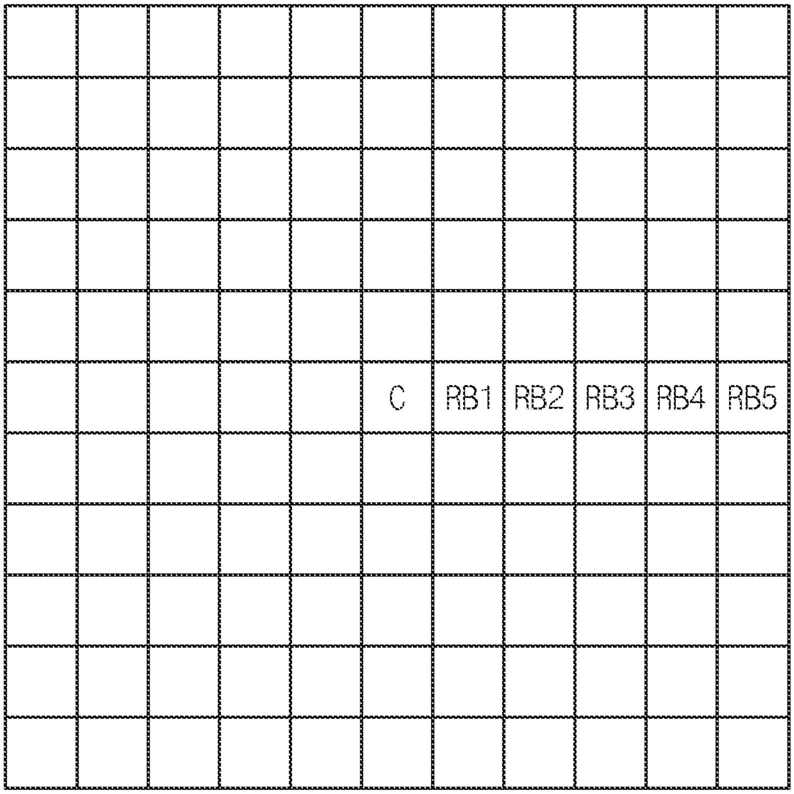

FIG. 5 is a schematic block diagram illustrating the driving controller 200 of FIG. 1. FIGS. 6 and 7 are schematic diagrams illustrating an operation of a temperature diffusion load determiner 220 of FIG. 5.

Referring to FIGS. 1 to 6, the driving controller 200 may include an average load determiner 210, a temperature diffusion load determiner 220 and/or a compensator 230.

The average load determiner 210 may determine an average load of the unit area based on the average grayscale value of the unit area and the pixel area ratio of the unit area.

In case that a number of the pixels is N*N, the average load determiner 210 may sum up all N*N grayscale values of the input image data IMG corresponding to the unit area. Then, the average grayscale value of the unit area may be obtained by dividing the summed grayscale value by N*N, which is the number of the pixels.

For example, the average load determiner 210 may convert the average grayscale value of the unit area into a first average load and determine the average load of the unit area by multiplying the first average load by the pixel area ratio.

In case that the average grayscale value of the unit area is 255, the load corresponding to the grayscale value of 255 is 100, and the pixel area ratio of the unit area is 100%, the first average load may be determined as 100 corresponding to the grayscale value of 255, and the average load of the unit area may be determined as 100 by multiplying 100, which is the first average load, by the pixel area ratio of 100%.

In case that the average grayscale value of the unit area is 100, the load corresponding to the grayscale value of 100 is 60, and the pixel area ratio of the unit area is 100%, the first average load may be determined as 60 corresponding to the grayscale value of 100, and the average load of the unit area may be determined as 60 by multiplying 60, which is the first average load, by the pixel area ratio of 100%.

In case that the average grayscale value of the unit area is 255, the load corresponding to the grayscale value of 255 is 100, and the pixel area ratio of the unit area is 60%, the first average load may be determined as 100 corresponding to the grayscale value of 255, and the average load of the unit area may be determined as 60 by multiplying 100, which is the first average load, by the pixel area ratio of 60%.

In case that the average grayscale value of the unit area is 100, the load corresponding to the grayscale value of 100 is 60, and the pixel area ratio of the unit area is 60%, the first average load may be determined as 60 corresponding to the grayscale value of 100, and the average load of the unit area may be determined as 36 by multiplying 60, which is the first average load, by the pixel area ratio of 60%.

As another example, the average load determiner 210 may determine an average grayscale value of the pixel area by multiplying the average grayscale value of the unit area by the pixel area ratio, and convert the average grayscale value of the pixel area into the average load of the unit area.

In case that the average grayscale value of the unit area is 255, the load corresponding to the grayscale value of 255 is 100, and the pixel area ratio of the unit area is 100%, the average grayscale value of the pixel area may be 255 by multiplying 255, which is the average grayscale value of the unit area, by the pixel area ratio of 100%, and the average load of the unit area may be converted to 100 corresponding to the grayscale value of 255, which is the average grayscale value of the pixel area.

In case that the average grayscale value of the unit area is 255, the load corresponding to the grayscale value of 153 is 60, and the pixel area ratio of the unit area is 60%, the average grayscale value of the pixel area may be 153 by multiplying 255, which is the average grayscale value of the unit area, by the pixel area ratio of 60%, and the average load of the unit area may be converted to 60 corresponding to the grayscale value of 153, which is the average grayscale value of the pixel area.

The temperature diffusion load determiner 220 may determine the temperature diffusion load based on the average loads, the temperature diffusion ratio and the weight ratio of the adjacent unit areas adjacent to the unit area.

A central unit area may influence adjacent unit areas based on the average load, the temperature diffusion ratio, and the weight ratio of the central unit area so that the average load, the temperature diffusion ratio, and the weight ratio at a specific unit area may be determined with respect to the central unit area.

In contrast, the temperature diffusion load may refer to the load obtained by the adjacent unit areas due to the influence of the central unit area.

The temperature diffusion ratio may be a ratio representing temperature diffusion between neighboring unit areas. As the distance between the specific unit area and the central unit area increases, the temperature diffusion ratio of the central unit area at the specific unit area may decrease.

The compensator 230 may compensate the input image data IMG based on the average load of the unit area and the temperature diffusion load of the unit area to generate the compensated data signal DATA.

FIG. 6 is a schematic diagram illustrating the temperature diffusion load considering only the temperature diffusion ratio.

In FIG. 6, a first adjacent unit area adjacent to the central unit area C may receive a temperature diffusion load of a first ratio RA1 from the central unit area C. The temperature diffusion load of the first adjacent unit area may be determined by multiplying the average load of the central unit area C by the first ratio RA1, which is the temperature diffusion ratio.

In FIG. 6, a second adjacent unit area adjacent to the central unit area C may receive a temperature diffusion load of a second ratio RA2 from the central unit area C. A distance between the central unit area C and the second adjacent unit area may be greater than a distance between the central unit area C and the first adjacent unit area so that the second ratio RA2 may be less than the first ratio RA1. The temperature diffusion load of the second adjacent unit area may be determined by multiplying the average load of the central unit area C by the second ratio RA2, which is the temperature diffusion ratio.

In FIG. 6, a third adjacent unit area adjacent to the central unit area C may receive a temperature diffusion load of a third ratio RA3 from the central unit area C. A distance between the central unit area C and the third adjacent unit area may be greater than a distance between the central unit area C and the second adjacent unit area so that the third ratio RA3 may be less than the first ratio RA2. The temperature diffusion load of the third adjacent unit area may be determined by multiplying the average load of the central unit area C by the third ratio RA3, which is the temperature diffusion ratio.

In FIG. 6, a fourth adjacent unit area adjacent to the central unit area C may receive a temperature diffusion load of a fourth ratio RA4 from the central unit area C. A distance between the central unit area C and the fourth adjacent unit area may be greater than a distance between the central unit area C and the third adjacent unit area so that the fourth ratio RA4 may be less than the first ratio RA3. The temperature diffusion load of the fourth adjacent unit area may be determined by multiplying the average load of the central unit area C by the fourth ratio RA4, which is the temperature diffusion ratio.

In FIG. 6, a fifth adjacent unit area adjacent to the central unit area C may receive a temperature diffusion load of a fifth ratio RA5 from the central unit area C. A distance between the central unit area C and the fifth adjacent unit area may be greater than a distance between the central unit area C and the fourth adjacent unit area so that the fifth ratio RA5 may be less than the first ratio RA4. The temperature diffusion load of the fifth adjacent unit area may be determined by multiplying the average load of the central unit area C by the fifth ratio RA5, which is the temperature diffusion ratio.

For example, in case that the average load of the central unit area C is 100, the first ratio RA1 is 90%, the second ratio RA2 is 80%, the third ratio RA3 is 60%, the fourth ratio RA4 is 40% and the fifth ratio RA5 is 20%, the temperature diffusion load of the first to fifth adjacent unit areas may be respectively 90, 80, 60, 40 and 20.

Final loads of the first to fifth adjacent unit areas may be determined by adding the respective temperature diffusion loads to the respective average loads of the first to fifth adjacent unit areas.

In FIG. 6, for convenience of explanation, the temperature diffusion ratios in a right direction are explained based on the central unit area C. The temperature diffusion ratios may be determined in all directions from the central unit area C.

Although the first to fifth adjacent unit areas receive the temperature diffusion loads from a central unit area C for convenience of explanation, but in reality, each of the first to fifth adjacent unit areas may receive the temperature diffusion loads from all unit areas adjacent to the first to fifth adjacent unit areas.

FIG. 7 is a schematic diagram illustrating the temperature diffusion load considering both the temperature diffusion ratio and the weight ratio.

In FIG. 7, a first adjacent unit area adjacent to the central unit area C may receive a temperature diffusion load of a sixth ratio RB1 from the central unit area C. The temperature diffusion load of the first adjacent unit area may be determined by multiplying the average load of the central unit area C by the sixth ratio RB1, which is a multiplication of the first ratio RA1, which is the temperature diffusion ratio, and the weight ratio.

For example, in case that the pixel area ratio of the central unit area C is 100%, the weight ratio may be determined as 100%. In case that the pixel area ratio of the central unit area C is less than 100%, the weight ratio may be determined to be less than 100%.

In case that the pixel area ratio of the unit area is less than 100%, it means that the unit area is the atypical unit area. The temperature diffusion of the atypical unit area may be less than the temperature diffusion of the typical unit area.

Thus, in case that the unit area is the atypical unit area, it may be desirable or necessary to reduce the temperature diffusion load affecting adjacent unit areas using the weight ratio.

For example, as the pixel area ratio of the central unit area decreases, the weight ratio of the central unit area may decrease.

The pixel area ratio of the central unit area may be different from the weight ratio of the central unit area.

In FIG. 7, a second adjacent unit area adjacent to the central unit area C may receive a temperature diffusion load of a seventh ratio RB2 from the central unit area C. A distance between the central unit area C and the second adjacent unit area may be greater than a distance between the central unit area C and the first adjacent unit area so that the seventh ratio RB2 may be less than the sixth ratio RB1. The temperature diffusion load of the second adjacent unit area may be determined by multiplying the average load of the central unit area C by the seventh ratio RB2, which is a multiplication of the second ratio RA2, which is the temperature diffusion ratio, and the weight ratio.

Similarly, in FIG. 7, a third adjacent unit area adjacent to the central unit area C may receive a temperature diffusion load of an eighth ratio RB3 from the central unit area C. The temperature diffusion load of the third adjacent unit area may be determined by multiplying the average load of the central unit area C by the eighth ratio RB3, which is a multiplication of the third ratio RA3, which is the temperature diffusion ratio, and the weight ratio.

Similarly, in FIG. 7, a fourth adjacent unit area adjacent to the central unit area C may receive a temperature diffusion load of a ninth ratio RB4 from the central unit area C. The temperature diffusion load of the fourth adjacent unit area may be determined by multiplying the average load of the central unit area C by the ninth ratio RB4, which is a multiplication of the fourth ratio RA4, which is the temperature diffusion ratio, and the weight ratio.

Similarly, in FIG. 7, a fifth adjacent unit area adjacent to the central unit area C may receive a temperature diffusion load of a tenth ratio RB5 from the central unit area C. The temperature diffusion load of the fifth adjacent unit area may be determined by multiplying the average load of the central unit area C by the tenth ratio RB5, which is a multiplication of the fifth ratio RA5, which is the temperature diffusion ratio, and the weight ratio.

For example, in case that the average load of the central unit area C is 100, the first ratio RA1 is 90%, the second ratio RA2 is 80%, the third ratio RA3 is 60%, the fourth ratio RA4 is 40%, the fifth ratio RA5 is 20% and the weight ratio is 70%, the temperature diffusion load of the first to fifth adjacent unit areas may be respectively 63, 56, 42, 28 and 14.

Final loads of the first to fifth adjacent unit areas may be determined by adding the respective temperature diffusion loads to the respective average loads of the first to fifth adjacent unit areas.

Figure 8:
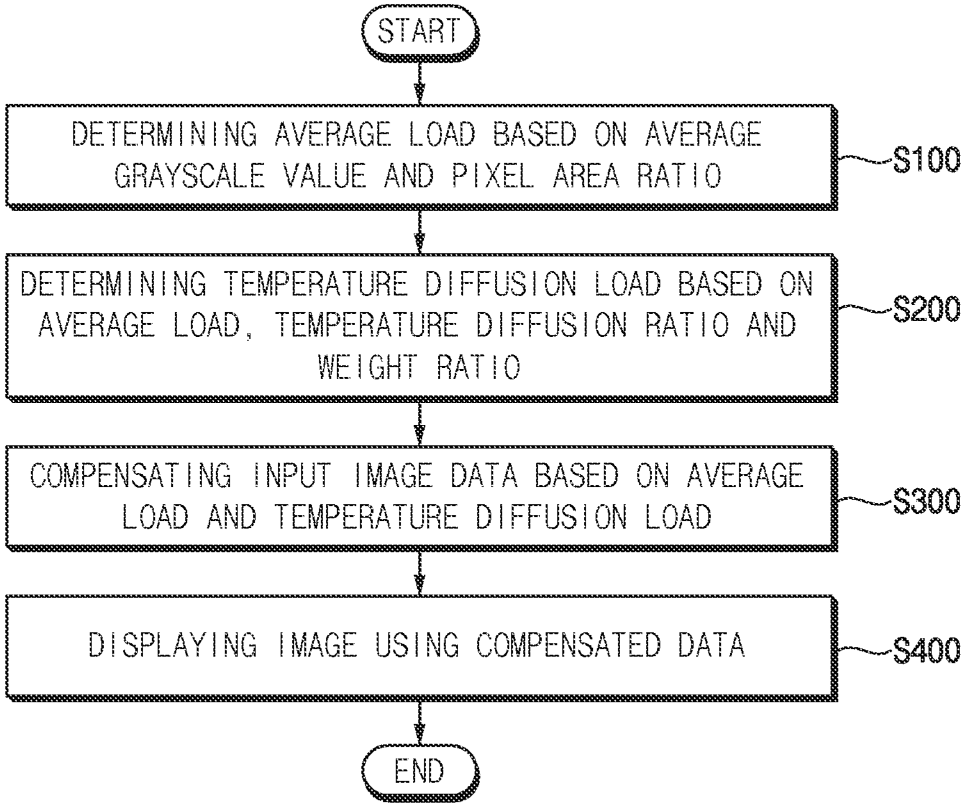
FIG. 8 is a schematic flowchart diagram illustrating a method of driving a display panel using the display apparatus of FIG. 1.

FIG. 8 is a schematic flowchart diagram illustrating a method of driving the display panel 100 using the display apparatus of FIG. 1.

Referring to FIGS. 1 to 8, the method of driving the display panel 100 may include determining the average load of the unit area (operation S100) based on the average grayscale value of the unit area and the pixel area ratio of the unit area, determining the temperature diffusion load of the unit area (operation S200) based on the average loads, the temperature diffusion ratios and the weight ratios of the adjacent unit areas adjacent to the unit area, generating the compensated data signal DATA (operation S300) by compensating the input image data IMG based on the average load of the unit area and the temperature diffusion load of the unit area and displaying the image (operation S400) based on the compensated data signal DATA.

According to the embodiment, the driving controller 200 may determine the average load of the unit area based on the average grayscale value of the unit area and the pixel area ratio of the unit area, so that the accuracy of the average load in the display apparatus including the atypical display area may be increased.

The driving controller 200 may determine the temperature diffusion load of the unit area based on the average loads, the temperature diffusion ratios and the weight ratios of the adjacent unit areas adjacent to the unit area so that the accuracy of the temperature diffusion load in the display apparatus including the atypical display area may be increased.

The accuracy of the average load and the accuracy of the temperature diffusion load may be increased so that the accuracy of the compensation of the input image data using the average load and the temperature diffusion load may be increased. Accordingly, the display quality of the display panel 100 may be enhanced.

Figure 9:
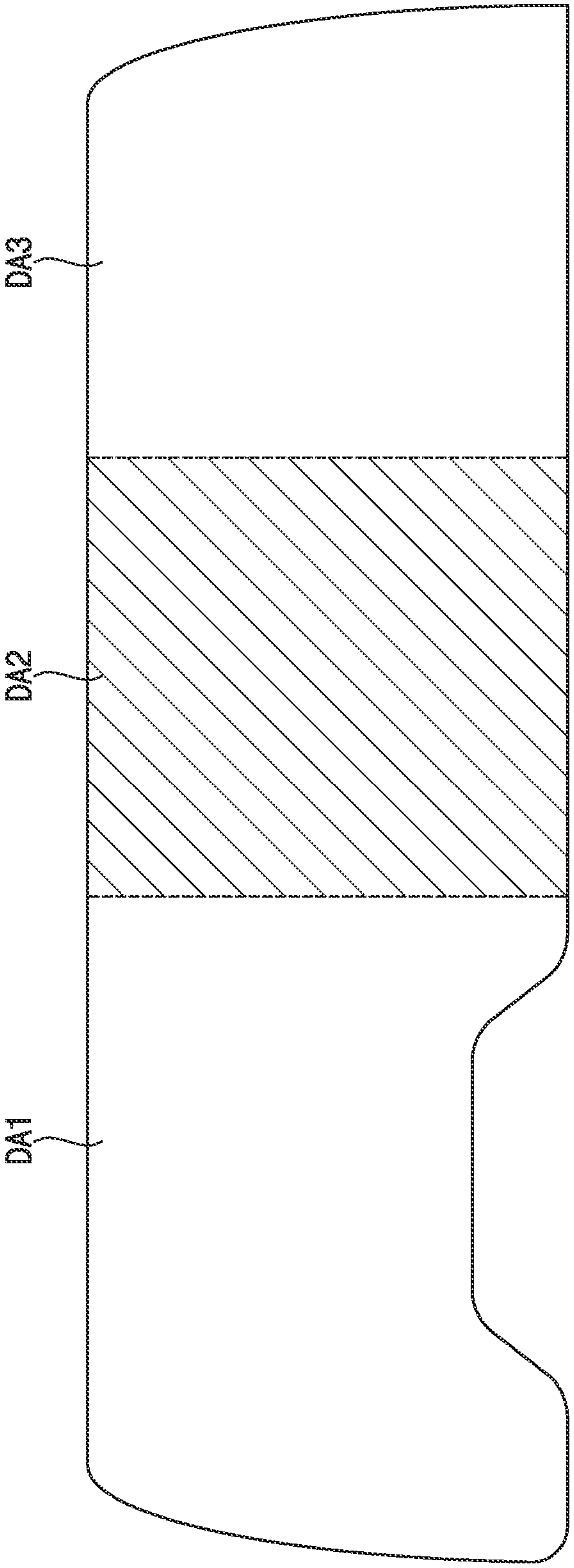
FIG. 9 is a schematic diagram illustrating an example of a display panel of a display apparatus according to an embodiment of the disclosure.
Figure 10:
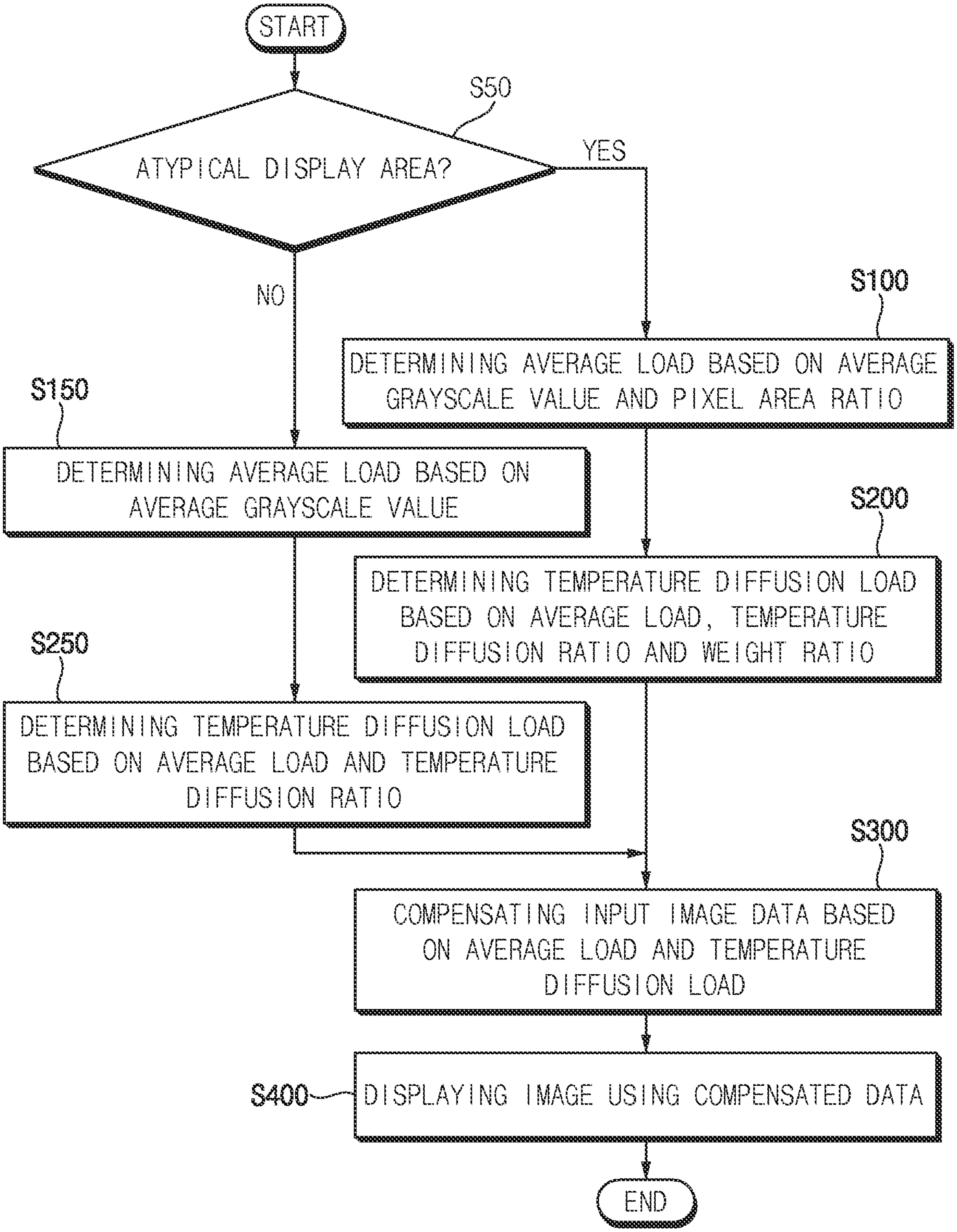
FIG. 10 is a schematic flowchart diagram illustrating a method of driving a display panel using the display apparatus of FIG. 9.

FIG. 9 is a schematic diagram illustrating an example of a display panel of a display apparatus according to an embodiment of the disclosure. FIG. 10 is a schematic flowchart diagram illustrating a method of driving a display panel using the display apparatus of FIG. 9.

The display apparatus according to the embodiment may be distinguishable from the display apparatus of the previous embodiment explained referring to FIGS. 1 to 8 at least in that the display panel may include an atypical display area and a typical display area, and the operation of the driving controller may vary according to whether the data are of the atypical display area or the typical display area. The same reference numerals will be used to refer to the same or like parts as those described in the previous embodiment of FIGS. 1 to 8 and any repetitive explanation concerning the above elements will be omitted.

Referring to FIGS. 9 and 10, in the embodiment, the driving controller 200 may determine an average load of a unit area of the display panel 100 based on an average grayscale value of the unit area and a pixel area ratio of the unit area, may determine a temperature diffusion load of the unit area based on average loads, temperature diffusion ratios and weight ratios of adjacent unit areas adjacent to the unit area and may compensate the input image data IMG based on the average load of the unit area and the temperature diffusion load of the unit area to generate a compensated data signal DATA.

The display panel 100 may include a first display area DA1 which is an atypical display area and a second display area DA2 which is a typical display area. The display panel 100 may further include a third display area DA3.

For example, the display panel 100 may be an automotive display panel. The first display area DA1 may be a driver area, the second display area DA2 may be a common area and the third display area DA3 may be a passenger area.

At least one unit area of the atypical display area may include a non-pixel area. In contrast, all unit areas of the typical display area may include only the pixel areas.

In case that the input image data IMG are of the atypical display area, the driving controller 200 may determine the average load of the unit area based on the average grayscale value of the unit area and the pixel area ratio of the unit area and may determine the temperature diffusion load of the unit area based on the average loads, the temperature diffusion ratios and the weight ratios of the adjacent unit areas adjacent to the unit area.

In contrast, in case that the input image data IMG are of the typical display area, the driving controller 200 may determine the average load of the unit area based on the average grayscale value of the unit area and may determine the temperature diffusion load of the unit area based on the average loads and the temperature diffusion ratios of the adjacent unit areas adjacent to the unit area.

The method of driving the display panel 100 according to the embodiment may include determining whether the input image data IMG are of the atypical display area or the typical display area (operation S50), determining the average load of the unit area (operation S100) based on the average grayscale value of the unit area and the pixel area ratio of the unit area and determining the temperature diffusion load of the unit area (operation S200) based on the average loads, the temperature diffusion ratios and the weight ratios of the adjacent unit areas adjacent to the unit area in case that the input image data IMG are of the atypical display area, determining the average load of the unit area (operation S150) based on the average grayscale value of the unit area and determining the temperature diffusion load of the unit area (operation S250) based on the average loads and the temperature diffusion ratios of the adjacent unit areas adjacent to the unit area in case that the input image data IMG are of the typical display area, generating the compensated data signal DATA (operation S300) by compensating the input image data IMG based on the average load of the unit area and the temperature diffusion load of the unit area and displaying the image (operation S400) based on the compensated data signal DATA.

According to the embodiment, the driving controller 200 may determine the average load of the unit area based on the average grayscale value of the unit area and the pixel area ratio of the unit area, so that the accuracy of the average load in the display apparatus including the atypical display area may be increased.

The driving controller 200 may determine the temperature diffusion load of the unit area based on the average loads, the temperature diffusion ratios and the weight ratios of the adjacent unit areas adjacent to the unit area so that the accuracy of the temperature diffusion load in the display apparatus including the atypical display area may be increased.

The accuracy of the average load and the accuracy of the temperature diffusion load are increased so that the accuracy of the compensation of the input image data using the average load and the temperature diffusion load may be increased. Accordingly, the display quality of the display panel 100 may be enhanced.

Figure 11:
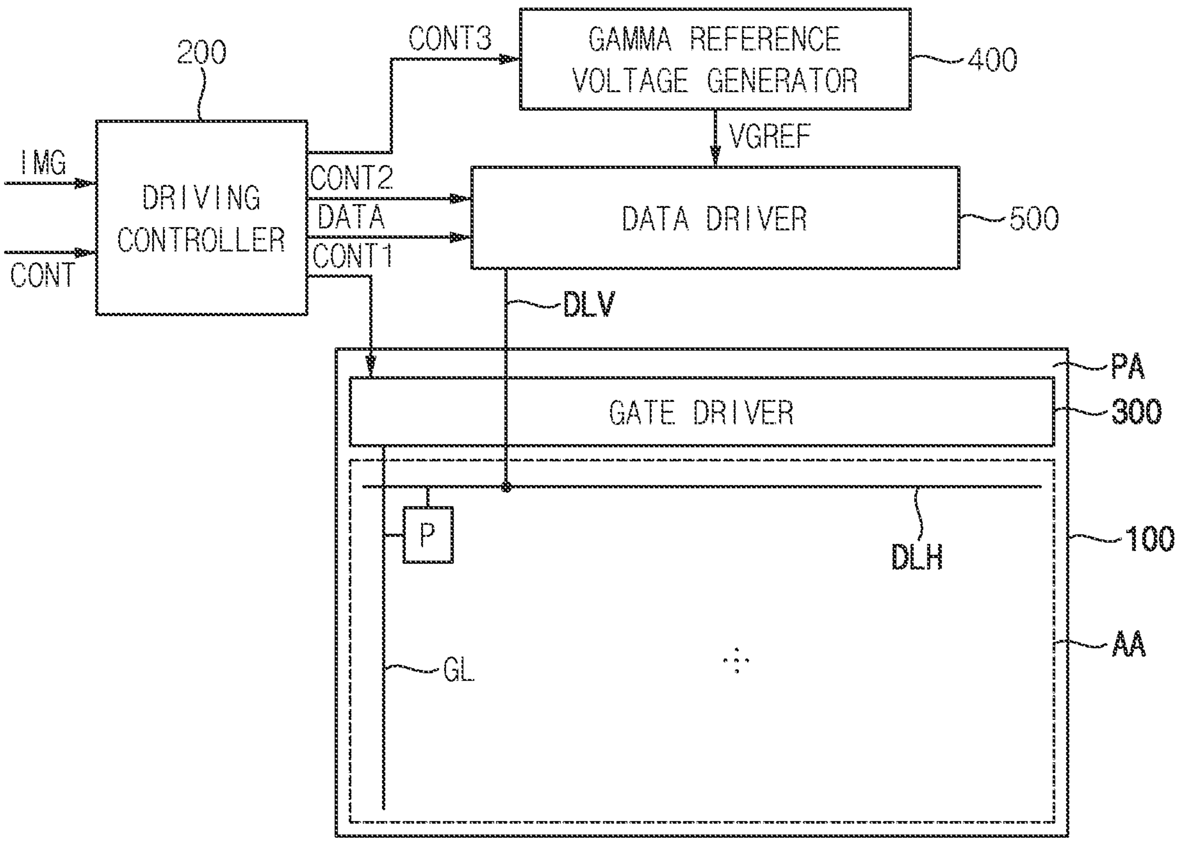
FIG. 11 is a schematic block diagram illustrating a display apparatus according to an embodiment of the disclosure.

FIG. 11 is a schematic block diagram illustrating a display apparatus according to an embodiment of the disclosure. FIGS. 12A to 12D are schematic diagrams illustrating various content usages of the display panel 100 of FIG. 11.

The display apparatus according to the embodiment may be distinguishable from the display apparatus of the previous embodiment explained referring to FIGS. 1 to 8 at least in that the gate driver and the data driver may be disposed in the same direction with respect to the display panel. The same reference numerals will be used to refer to the same or like parts as those described in the previous embodiment of FIGS. 1 to 8 and any repetitive explanation concerning the above elements will be omitted.

Figure 12A:
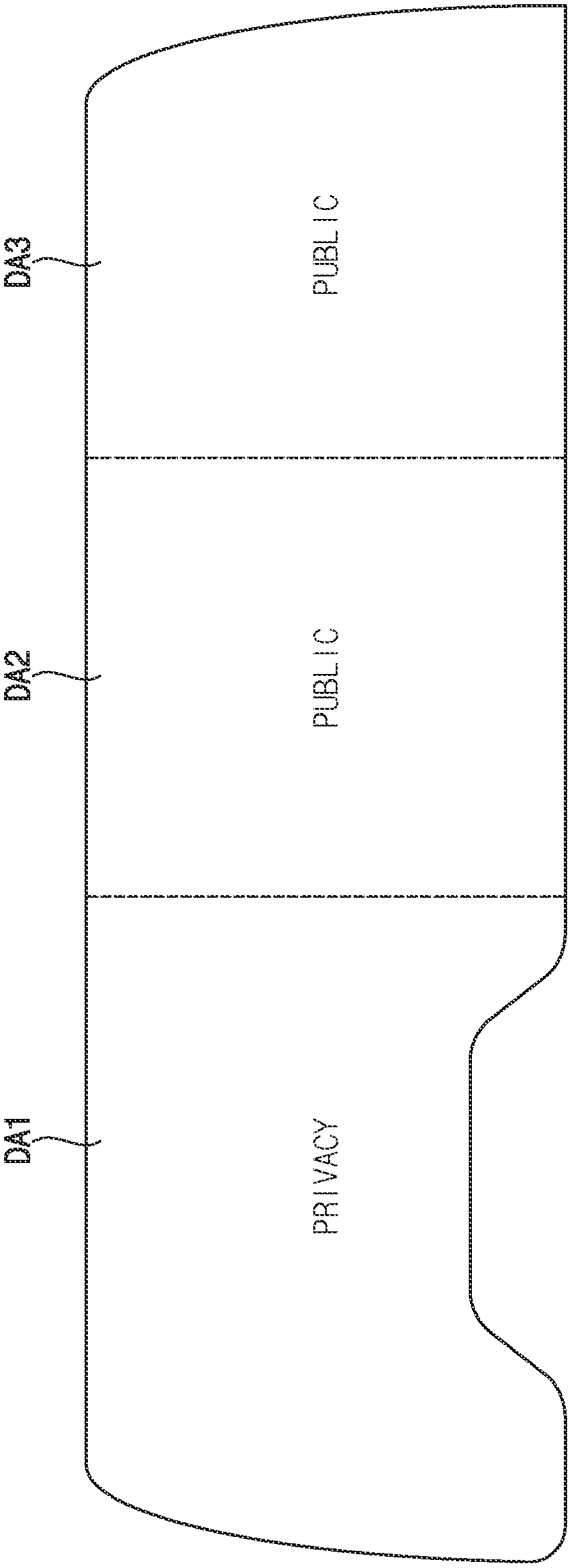
FIGS. 12A to 12D are schematic diagrams illustrating various content usages of the display panel of FIG. 11.
Figure 12B:
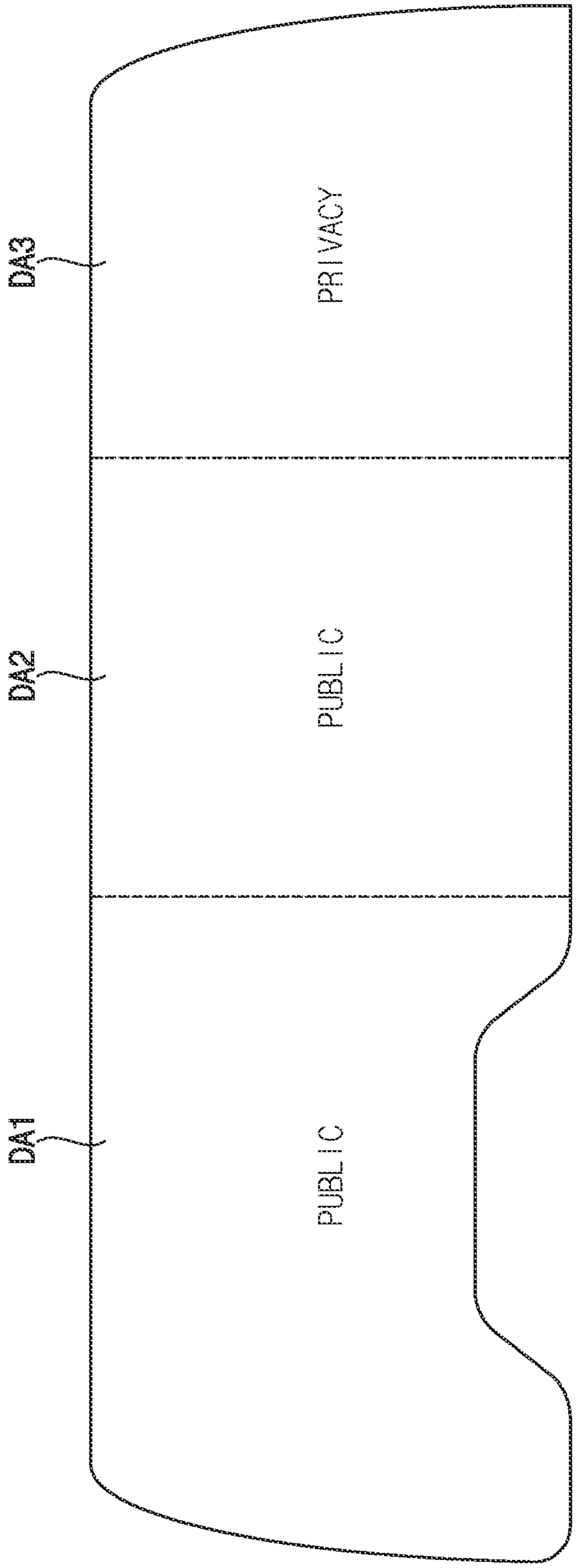
Figure 12C:
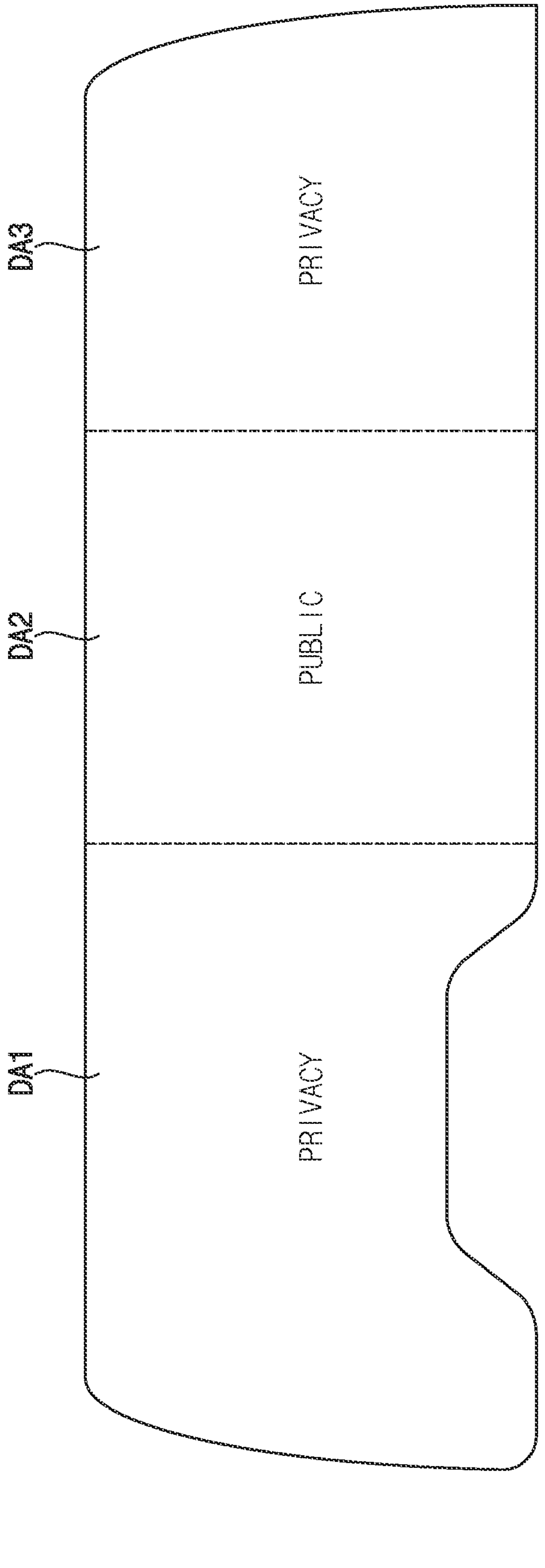
Figure 12D:
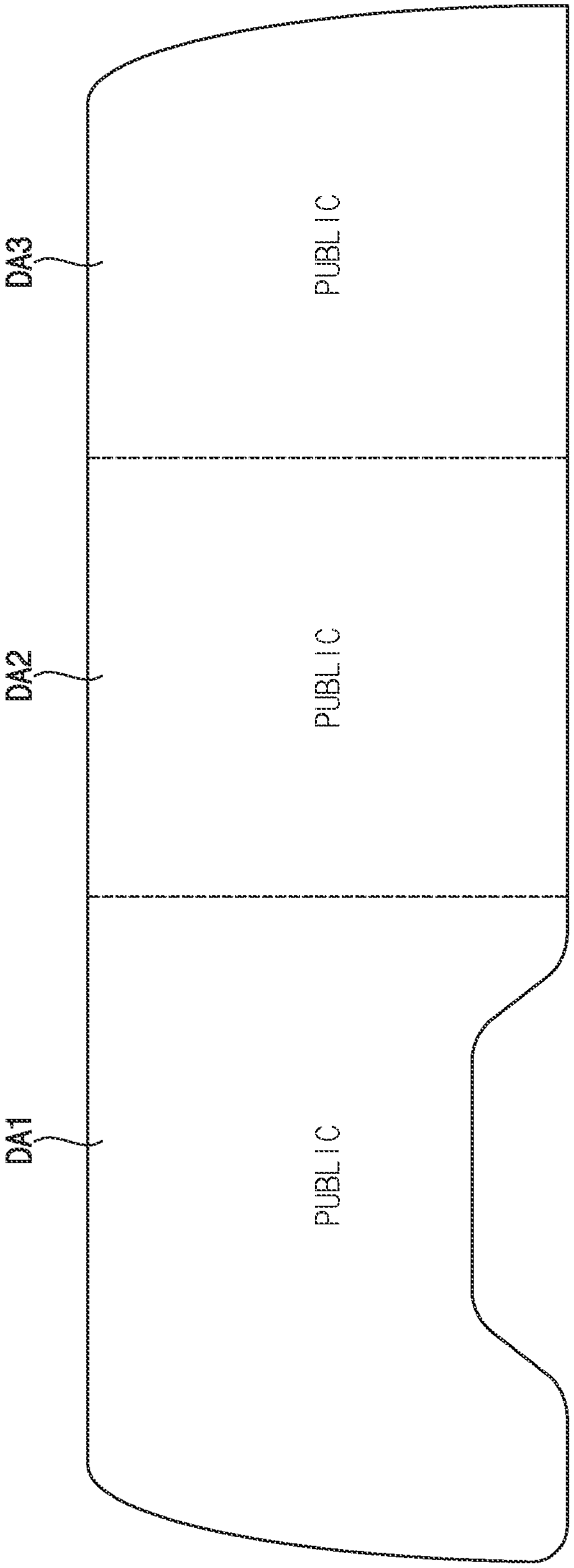

Referring to FIGS. 11 and 12D, in the embodiment, the driving controller 200 may determine an average load of a unit area of the display panel 100 based on an average grayscale value of the unit area and a pixel area ratio of the unit area, may determine a temperature diffusion load of the unit area based on average loads, temperature diffusion ratios and weight ratios of adjacent unit areas adjacent to the unit area and may compensate the input image data IMG based on the average load of the unit area and the temperature diffusion load of the unit area to generate a compensated data signal DATA.

In the embodiment, the gate driver 300 may be disposed adjacent to a longer side of the display panel 100. The data driver 500 may be disposed adjacent to the longer side of the display panel 100. The display panel 100 may include the gate line GL extending in an extending direction of a shorter side of the display panel 100 and a first data line DLH extending in an extending direction of the longer side of the display panel 100 and a second data line DLV extending in an extending direction of the shorter side of the display panel 100.

Although the gate driver 300 may be disposed on an upper portion of the peripheral region PA of the display panel 100 and the data driver 500 may be disposed adjacent to an upper side of the display panel 100 in FIG. 11, the disclosure may not be limited thereto. As another example, the gate driver 300 may be disposed on a lower portion of the peripheral region PA of the display panel 100 or on both of the upper portion and the lower portion of the peripheral region PA of the display panel 100. The data driver 500 may be disposed adjacent to a lower side of the display panel 100 and the data driver 500 may be disposed adjacent to both of the upper side and the lower side of the display panel 100.

The display panel 100 may have a high resolution in the first direction D1. For example, the display panel 100 may be an automotive display panel inside an automotive vehicle.

For example, the display panel 100 may include a first display area DA1, a second display area DA2 disposed adjacent to the first display area DA1 in the first direction D1 and a third display area DA3 disposed adjacent to the second display area DA2 in the first direction D1.

For example, the first display area DA1 may be a display area of the automotive display panel corresponding to a driver's seat. For example, the third display area DA3 may be a display area of the automotive display panel corresponding to a passenger's seat. For example, the second display area DA2 may be a display area of the automotive display panel corresponding to a common portion between the driver's seat and the passenger's seat.

The first display area DA1, the second display area DA2 and the third display area DA3 may be driven in independent frequencies. For example, in case that the first display area DA1 displays a still image and the third display area DA3 displays a moving image, the first display area DA1 may be driven in a low frequency and the third display area DA3 may be driven in a high frequency.

Gate signals applied to the first display area DA1, gate signals applied to the second display area DA2 and gate signals applied to the third display area DA3 may be independently applied. For example, the signals applied to the first display area DA1, the gate signals applied to the second display area DA2 and the gate signals applied to the third display area DA3 may be independently masked.

As shown in FIG. 12A, the first display area DA1 may have a privacy mode, the second display area DA2 may have a public mode and the third display area DA3 may have the public mode.

As shown in FIG. 12B, the first display area DA1 may have the public mode, the second display area DA2 may have the public mode and the third display area DA3 may have the privacy mode.

As shown in FIG. 12C, the first display area DA1 may have the privacy mode, the second display area DA2 may have the public mode and the third display area DA3 may have the privacy mode.

As shown in FIG. 12D, the first display area DA1 may have the public mode, the second display area DA2 may have the public mode and the third display area DA3 may have the public mode.

Although the display panel 100 may be divided into three display areas DA1, DA2 and DA3 in FIGS. 12A to 12D, the disclosure may not be limited thereto. As another example, the display panel 100 may be divided into two display areas or four or more display areas.

Although the display areas DA1, DA2 and DA3 may be disposed in the first direction D1 in FIGS. 12A to 12D, the disclosure may not be limited thereto. As another example, the display areas may be divided to be disposed in the second direction D2 or divided to be disposed in the first direction D1 and the second direction D2 or divided to be disposed in a direction different from the first direction D1 and the second direction D2.

For example, the display area may have a wide viewing angle in the public mode so that the display area may be visible even to a person located on sides of the display area. For example, the display area may have a narrow viewing angle in the privacy mode so that the display area may not be visible to a person located on sides of the display area.

In the embodiment, the gate driver 300 may extend along a longer side of the display panel 100 so that the content usage type (a disposed direction of the first, second and third display areas, the first direction D1) and the scan direction (the first direction D1). Thus, the frequency division driving method in which one or more the display areas DA1, DA2 and DA3 are driven in different driving frequencies may be applied to the display apparatus.

According to the embodiment, the driving controller 200 may determine the average load of the unit area based on the average grayscale value of the unit area and the pixel area ratio of the unit area, so that the accuracy of the average load in the display apparatus including the atypical display area may be increased.

The driving controller 200 may determine the temperature diffusion load of the unit area based on the average loads, the temperature diffusion ratios and the weight ratios of the adjacent unit areas adjacent to the unit area so that the accuracy of the temperature diffusion load in the display apparatus including the atypical display area may be increased.

The accuracy of the average load and the accuracy of the temperature diffusion load may be increased so that the accuracy of the compensation of the input image data using the average load and the temperature diffusion load may be increased. Accordingly, the display quality of the display panel 100 may be enhanced.

Figure 13:
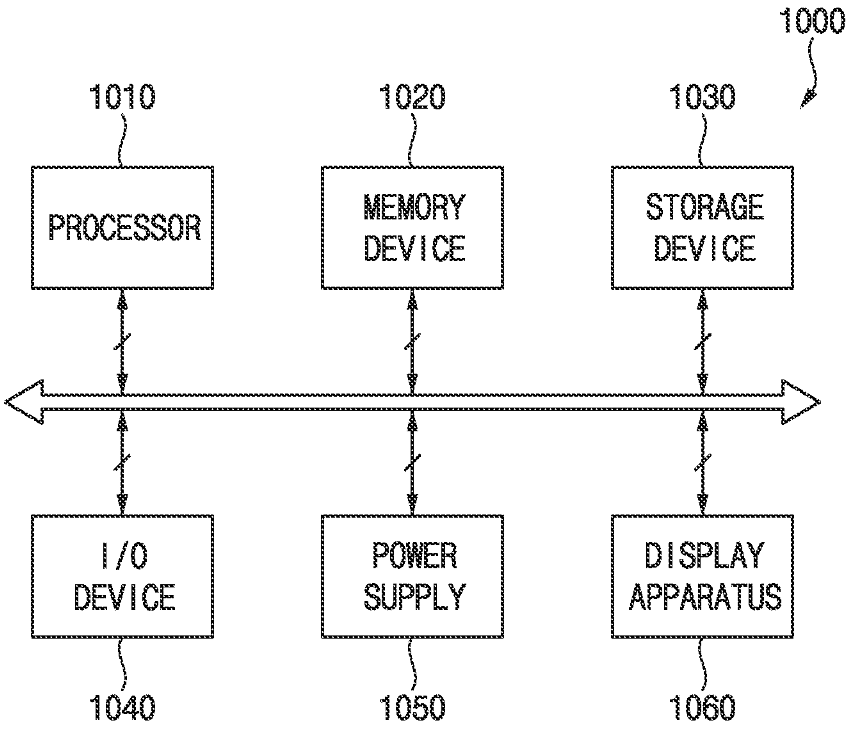
FIG. 13 is a schematic block diagram illustrating an electronic apparatus according to an embodiment of the disclosure.

FIG. 13 is a schematic block diagram illustrating an electronic apparatus according to an embodiment of the disclosure.

Referring to FIGS. 13, the electronic apparatus 1000 may include a processor 1010, a memory device 1020, a storage device 1030, an input/output (I/O) device 1040, a power supply 1050, and/or a display apparatus 1060. Here, the display apparatus 1060 may be the display apparatus of FIG. 1. The electronic apparatus 1000 may further include one or more ports for communicating with a video card, a sound card, a memory card, a universal serial bus (USB) device, other electronic apparatuses, etc.

In an embodiment, the electronic apparatus may be implemented as an automotive display system. However, the electronic apparatus 1000 is not limited thereto. For example, the electronic apparatus 1000 may be implemented as a smart phone, a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be, e.g., at least one of a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT (or cause them to be output) to the driving controller 200 of FIG. 1

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

Examples of the storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and/or an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the display apparatus and the method of driving the display panel using the display apparatus in the disclosure, the average load of the unit area and the temperature diffusion load of the unit area may be accurately determined so that the display quality of the display panel may be enhanced.

The above description is an example of technical features of the disclosure, and those skilled in the art to which the disclosure pertains will be able to make various modifications and variations. Thus, the embodiments of the disclosure described above may be implemented separately or in combination with each other.

The embodiments disclosed in the disclosure are intended not to limit the technical spirit of the disclosure but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display apparatus comprising:

a driving controller configured to:

determine whether input image data correspond to a non-rectangular display area or a rectangular display area, in response to the determination that the input image data correspond to the non-rectangular display area:

determine a first average load of a first unit area based on a first average grayscale value of the first unit area and a pixel area ratio of the first unit area, determine a first temperature diffusion load of the first unit area based on average loads, temperature diffusion ratios and weight ratios of adjacent unit areas adjacent to the first unit area, and compensate the input image data based on the first average load of the first unit area and the first temperature diffusion load of the first unit area to generate a first compensated data signal, in response to the determination that the input image data correspond to the rectangular display area:

determine a second average load of a second unit area based on a second average grayscale value of the second unit area, determine a second temperature diffusion load of the second unit area based on the average loads and temperature diffusion ratios of the adjacent unit areas adjacent to the second unit area, and compensate the input image data based on the second average load of the second unit area and the second temperature diffusion load of the second unit area to generate a second compensated data signal;

a data driver configured to convert the first compensated data signal or the second compensated data signal into a data voltage; and a display panel configured to display an image based on the data voltage.

2. The display apparatus of claim 1, wherein the pixel area ratio of the first unit area is determined based on a ratio of a pixel area in the first unit area and a non-pixel area in the first unit area.

3. The display apparatus of claim 2, wherein the driving controller is configured to convert the first average grayscale value of the first unit area into a first intermediate average load and to determine the first average load of the first unit area by multiplying the first intermediate average load by the pixel area ratio.

4. The display apparatus of claim 2, wherein the driving controller is configured to determine an average grayscale value of the pixel area by multiplying the average grayscale value of the first unit area by the pixel area ratio and to convert the average grayscale value of the pixel area into the first average load of the first unit area.

5. The display apparatus of claim 1, wherein the temperature diffusion ratios are ratios representing temperature diffusion between neighboring unit areas, and as a distance between the first unit area and a central unit area increases, a temperature diffusion ratio of the central unit area at the first unit area decreases.

6. The display apparatus of claim 5, wherein a temperature diffusion load of an adjacent unit area adjacent to the central unit area is determined by multiplying an average load of the central unit area by a temperature diffusion ratio of the central unit area and a weight ratio of the central unit area.

7. The display apparatus of claim 6, wherein as the pixel area ratio of the central unit area decreases, the weight ratio of the central unit area decreases.

8. The display apparatus of claim 6, wherein the pixel area ratio of the central unit area is different from the weight ratio of the central unit area.

9. The display apparatus of claim 1, wherein the display panel includes:

a first display area which is the non-rectangular display area; and a second display area which is the rectangular display area.

10. The display apparatus of claim 9, wherein at least one unit area of the non-rectangular display area includes a non-pixel area, and all unit areas of the rectangular display area include only pixel areas.

11. The display apparatus of claim 1, further comprising:

a gate driver configured to output a gate signal to the display panel, wherein the gate driver is disposed adjacent to a shorter side of the display panel, the data driver is disposed adjacent to a longer side of the display panel, and the display panel includes a gate line extending in an extending direction of the longer side of the display panel and a data line extending in an extending direction of the shorter side of the display panel.

12. The display apparatus of claim 1, further comprising:

a gate driver configured to output a gate signal to the display panel, wherein the gate driver is disposed adjacent to a longer side of the display panel, the data driver is disposed adjacent to the longer side of the display panel, and the display panel includes:

a gate line extending in an extending direction of a shorter side of the display panel;

a first data line extending in an extending direction of the longer side of the display panel; and a second data line extending in the extending direction of the shorter side of the display panel.

13. A method of driving a display panel, the method comprising:

determining whether input image data correspond to a non-rectangular display area or a rectangular display area;

determining, in response to the determination that the input image data corresponds to the non-rectangular display area, a first average load of a first unit area based on a first average grayscale value of the first unit area and a pixel area ratio of the first unit area;

determining, in response to the determination that the input image data corresponds to the non-rectangular display area, a first temperature diffusion load of the first unit area based on average loads, temperature diffusion ratios, and weight ratios of adjacent unit areas adjacent to the first unit area;

compensating, in response to the determination that the input image data corresponds to the non-rectangular display area, the input image data based on the first average load of the first unit area and the first temperature diffusion load of the first unit area to generate a first compensated data signal;

determining, in response to the determination that the input image data corresponds to the rectangular display area, a second average load of a second unit area based on a second average grayscale value of the second unit area;

determining, in response to the determination that the input image data corresponds to the rectangular display area, a second temperature diffusion load of the second unit area based on average loads and temperature diffusion ratios of adjacent unit areas adjacent to the second unit area;

compensating, in response to the determination that the input image data corresponds to the rectangular display area, the input image data based on the second average load and the second temperature diffusion load to generate a second compensated data signal; and displaying an image based on the first compensated data signal or the second compensated data signal.

14. The method of claim 13, wherein the pixel area ratio of the first unit area is determined based on a ratio of a pixel area in the first unit area and a non-pixel area in the first unit area.

15. The method of claim 13, wherein the temperature diffusion ratios are ratios representing temperature diffusion between neighboring unit areas, and as a distance between the first unit area and a central unit area increases, a temperature diffusion ratio of the central unit area at the first unit area decreases.

16. The method of claim 15, wherein the temperature diffusion load of an adjacent unit area adjacent to the central unit area is determined by multiplying an average load of the central unit area by a temperature diffusion ratio of the central unit area and a weight ratio of the central unit area.

17. The method of claim 16, wherein as the pixel area ratio of the central unit area decreases, the weight ratio of the central unit area decreases.

18. A method of driving a display panel, the method comprising:

determining whether input image data correspond to a non-rectangular display area or a rectangular display area;

determining, in response to the determination that the input image data corresponds to the non-rectangular display area, a first average load of a first unit area based on a first average grayscale value of the first unit area and a pixel area ratio of the first unit area and determining a first temperature diffusion load of the unit area based on average loads, temperature diffusion ratios, and weight ratios of adjacent unit areas adjacent to the first unit area;

determining, in response to the determination that the input image data corresponds to the rectangular display area, a second average load of a second unit area based on a second average grayscale value of the second unit area and determining a second temperature diffusion load of the unit area based on average loads and the temperature diffusion ratios of the adjacent unit areas adjacent to the second unit area;

generating a first compensated data signal by compensating the input image data based on the first average load of the first unit area and the first temperature diffusion load of the first unit area;

generating a second compensated data signal by compensating the input image data based on the second average load of the second unit area and the second temperature diffusion load of the second unit area;

converting the first compensated data signal or the second compensated data signal into a data voltage; and displaying an image based on the data voltage.

* * * * *